June 26, 1928.
C. WASEIGE
1,675,071
UNDERCARRIAGE FOR MOTOR VEHICLES
Filed April 22, 1924    2 Sheets-Sheet 1
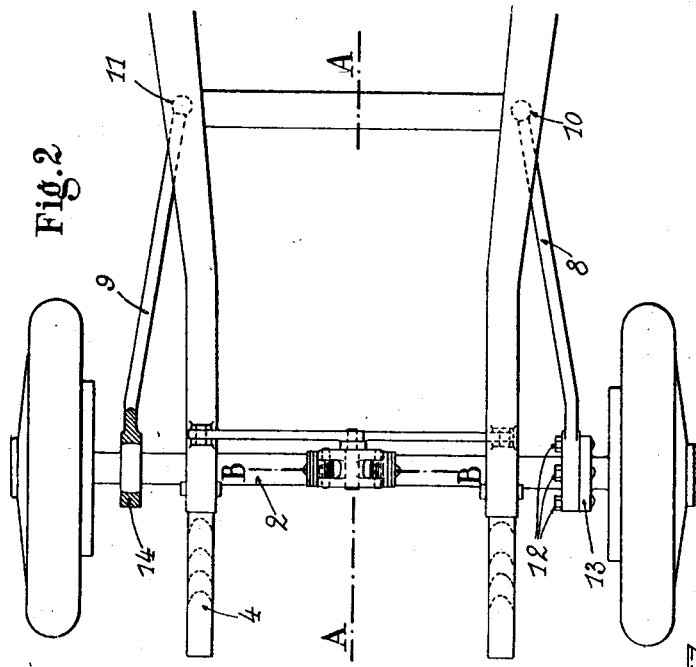
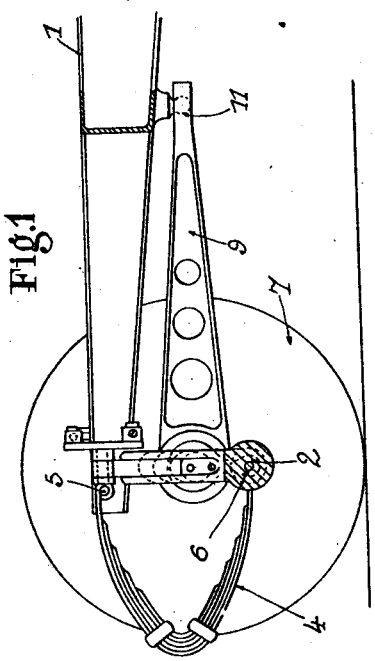
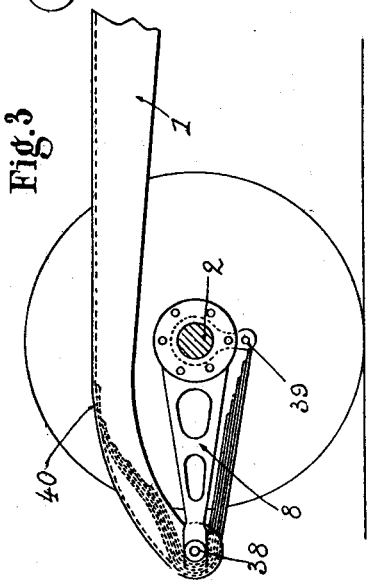
Inventor
Charles Waseige
By Marks & Clerk
Attys.

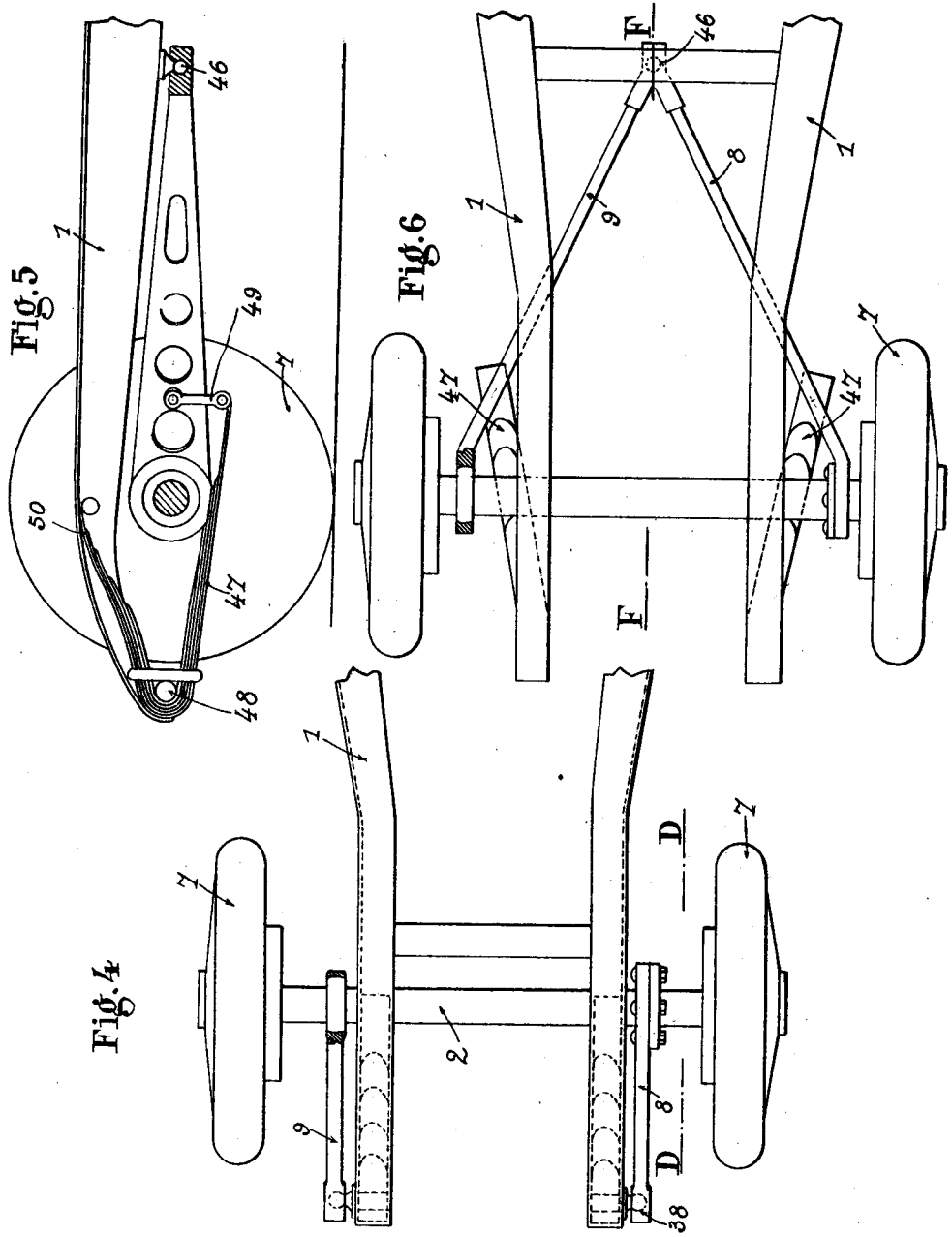

Patented June 26, 1928.

1,675,071

UNITED STATES PATENT OFFICE.

CHARLES WASEIGE, OF RUEIL, FRANCE, ASSIGNOR TO HENRI & MAURICE FARMAN, OF BILLANCOURT, SEINE, FRANCE, A FRENCH PARTNERSHIP COMPANY.

UNDERCARRIAGE FOR MOTOR VEHICLES.

Application filed April 22, 1924, Serial No. 708,266, and in France May 9, 1923.

The present invention relates to undercarriages for motor vehicles of the type embodying two thrust links adapted to transmit to the chassis frame the shocks to which the steering wheels and front axle are subjected when rolling.

One object of the invention is to provide a device of this kind wherein one of the thrust links is rigidly attached to the front axle, so as to absorb the braking reaction, while the other thrust link is pivoted to said front axle, so as to avoid any torsion or twisting stress upon said front axle, in the case where one wheel passes over a salient obstacle of the road.

Other features and new combinations of parts will be disclosed in the following description with reference to the appended drawings.

The appended drawings which show by way of example various embodiments of the invention:

Fig. 1 is a longitudinal axial section on the line A—A Fig. 2 of the front portion of a motor vehicle undercarriage according to the invention.

Fig. 2 is a plan view of the same.

Figs. 3 and 4 are a vertical section on the line D—D, and a plan view, of a modification suspension springs.

Figs. 5 and 6 are a longitudinal section on the line F—F and a plan view of another modification.

In the construction shown in Figs. 1 and 2, the vehicle frame 1 is connected with the front axle 2 by means of suspension springs, for example semi-elliptical springs 4, one end whereof is pivoted to an axle pin 5 carried by the frame and the other end is attached to an axle pin 6 secured to the vehicle axle 2. These springs are disposed in such manner as to ensure an easier suspension, so that the attaching points 5 at the front and rear of the frame shall be spaced apart by the maximum distance allowed by the over all length of the vehicle. In order to provide a mechanical connection between the frame and the vehicle axles and limit the motion of the frame relative to the vehicle axles, the front axle 2, which carries the steering wheels 7 is connected with the frame 1 by a reaction link 8 and a thrust link 9; said links are pivoted to the vehicle frame by means of ball-joints 10 and 11. The other end of the link 8 is secured, by bolts 12, or in any other manner, to a disc 13 integral with the axle 2, whilst the other end of the link 9 is connected with the said axle through the intermediary of a ball-joint 14. The link 8 is thus adapted to absorb all the braking reactions, which would tend to rotate the front axle together with the brake drums. It should be noted that only one of the links 8 and 9 is rigidly connected to the front axle, in order to avoid any torsion or twisting stress upon the front axle when one wheel passes over a salient obstacle of the road, the other wheel remaining at a lower level. Assuming that the front wheels are at different levels, due to a salient obstacle of the road, one of the links 8 for example, will turn through a greater angle about its pivot 10 than the link 9 about its pivot 11. In other words the links 8 and 9 will cease to be in a common horizontal plane. In the case referred to, the connection 12—13 will be at a level above the ball joint 14, the connection 12—13, together with the link 8 having turned as a whole about the pivot 10 relatively to the ball-joint 14 and link 9.

If the link 9 were rigidly connected to the front axle, it will be seen that the geometrical figure corresponding to the cross section of the front axle adjacent the connection 12—13 would not remain parallel to the geometrical figure corresponding to the cross section adjacent the connection 14, but would have turned relatively thereto. This rotation would result in a torsion or twisting stress upon the front axle. But, due to the ball joint 14, such a torsion or twisting stress is eliminated because the ball shaped part of the front axle turns freely within the socket of link 8 at the same time as the rigid connection 12—13 rotates about its pivot 10.

Figs. 3 and 4 illustrate a modification of the longitudinal links cooperating with the front axle 2. In this modification, the links 8 and 9 are directed towards the front of the axle instead of towards the rear as in Figs. 1 and 2. Each V-shaped spring is secured at its middle part 38 to the corresponding longitudinal of the frame 1, one end of the spring being attached to a shackle revoluble on the vehicle axle 2 and the other end 40 resting upon the flange of the longitudinal.

Figs. 5 and 6 show another modification in which the links 8 and 9 are secured together and are pivoted to a cross-piece of the frame 1 by means of a single ball joint 46. Further, the V-shaped springs 47 are secured by the middle part 48 to the longitudinals of the frame 1, one end of each spring being pivoted to a shackle 49 attached to the links 8 and 9 whilst the other end 50 is freely slidable on the flange of the corresponding longitudinal of the frame.

All the arrangements above described are given solely by way of example, and obviously various constructional changes may be made in these arrangements without departing from the scope of the invention.

Having now described my invention what I claim as new and desire to secure by Letters Patent is:

1. In an undercarriage for motor vehicle the combination with the frame, front axle, and suspension springs, of two links pivoted to said frame and adapted to withstand the longitudinal thrusts upon said axle, one of said links being also pivoted to said axle, while the other link is rigidly attached to the latter, is adapted to withstand the braking reaction.

2. In an undercarriage for motor vehicle the combination with the frame, front axle, and suspension springs, of two links pivoted to said frame by means of ball joints and adapted to withstand the longitudinal thrusts upon said axle, said links being directed from said axle towards the front, the ball joints being located at the front end of said frame, and one of said links being also pivoted to said axle while the other link is rigidly attached to the latter, is adapted to withstand the braking reaction.

3. In an undercarriage for motor vehicle, the combination with the frame and front axle, of semi-elliptical springs secured by their middle portion to said frame, and two links pivoted to said frame and adapted to withstand the longitudinal thrusts upon said axle, one of said links being also pivoted to said axle while the other link rigidly attached to the latter and two pivotal members pivotally connected to said front axle, one end of each spring being adapted to slide upon the frame while the other end is pivoted to the corresponding pivotal members.

In testimony whereof I have signed my name to this specification.

CHARLES WASEIGE.